United States Patent [19]

Kaihara et al.

[11] Patent Number: 5,337,108
[45] Date of Patent: Aug. 9, 1994

[54] CAMERA

[75] Inventors: Shoji Kaihara; Shousuke Haraguchi, both of Kanagawa, Japan

[73] Assignee: Canon Kabushiki Kaisha, Tokyo, Japan

[21] Appl. No.: 969,347

[22] Filed: Oct. 30, 1992

Related U.S. Application Data

[62] Division of Ser. No. 650,865, Feb. 5, 1991, Pat. No. 5,182,590.

[30] Foreign Application Priority Data

Feb. 9, 1990 [JP] Japan ................. 2-030021
Feb. 9, 1990 [JP] Japan ................. 2-030023

[51] Int. Cl.$^5$ ................ G03B 1/60; G03B 1/00
[52] U.S. Cl. ................ 354/218; 354/212
[58] Field of Search ............ 354/217, 218, 212

[56] References Cited

U.S. PATENT DOCUMENTS

| | | | |
|---|---|---|---|
| 4,482,227 | 11/1984 | Shiozawa et al. | 354/218 X |
| 4,652,104 | 3/1987 | Harvey | 354/106 |
| 4,679,926 | 7/1987 | Suzuki et al. | 354/217 X |
| 4,780,734 | 10/1988 | Ogawa et al. | 354/217 X |
| 4,783,671 | 11/1988 | Haraguchi | 354/24 |
| 4,816,851 | 3/1989 | Fukahori et al. | 354/173.1 |
| 4,864,336 | 9/1989 | Fukahori et al. | 354/152 |
| 4,910,543 | 3/1990 | Kawamura et al. | 354/173.1 |
| 4,918,474 | 4/1990 | Kawamura et al. | 354/173.1 |
| 5,019,843 | 5/1991 | Ogawa et al. | 354/106 |

*Primary Examiner*—Michael L. Gellner
*Assistant Examiner*—Jae N. Noh
*Attorney, Agent, or Firm*—Fitzpatrick, Cella, Harper & Scinto

[57] ABSTRACT

A camera comprises a data imprinting device which is arranged to imprint data on the surface of film from a front side of an optical axis and is disposed between an aperture and a spool in a position to overlap with a focal plane shutter unit in the optical axis direction; a rotary member which is arranged to be rotated following the movement of the film surface and is disposed between the aperture and the spool; and a control part which is arranged to control the action of the imprinting device by detecting the amount of rotation of the rotary member.

8 Claims, 16 Drawing Sheets

FIG.6
FIG.7
FIG.8
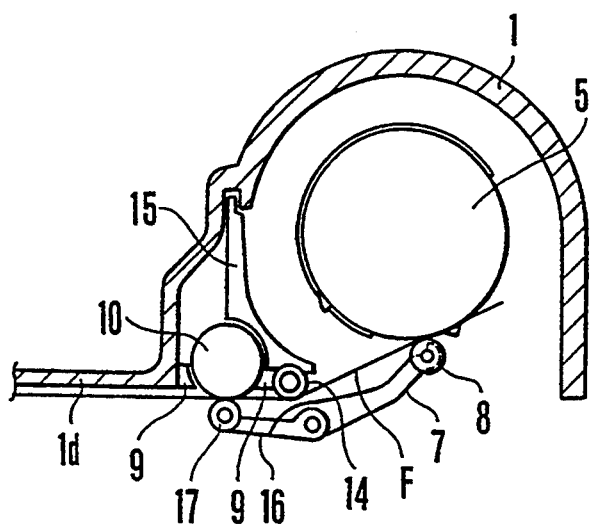
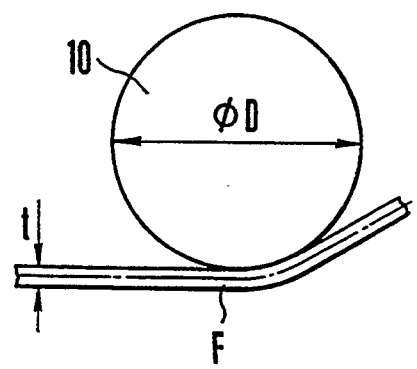
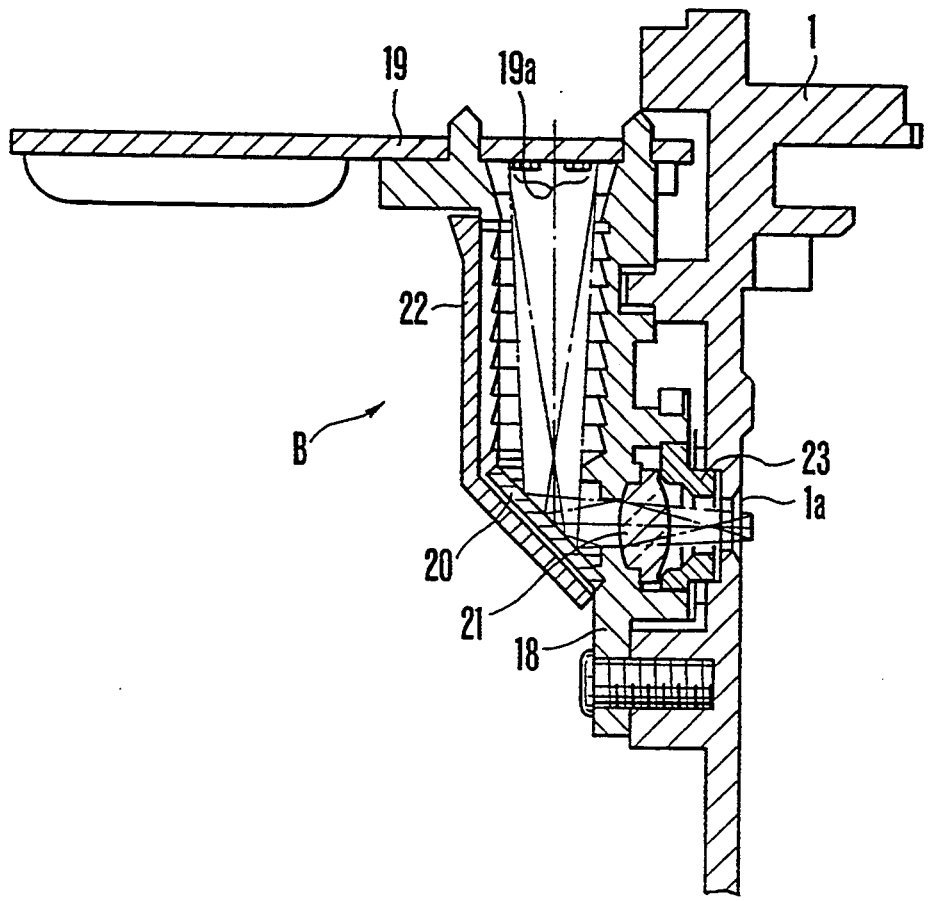

FIG.20
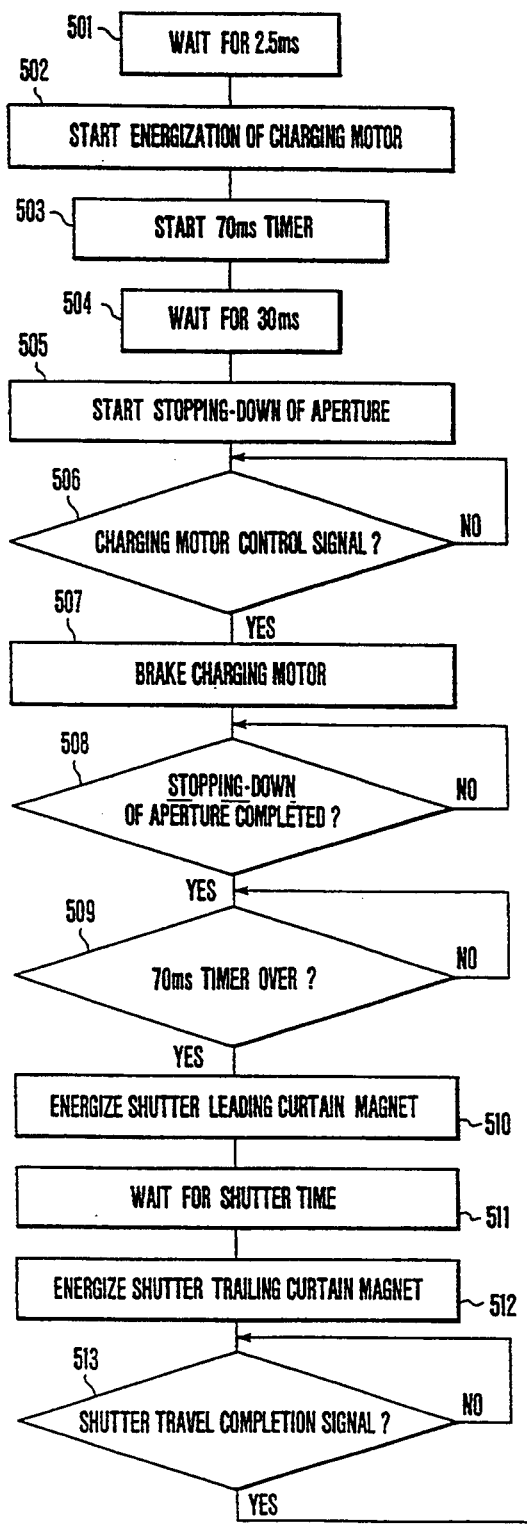
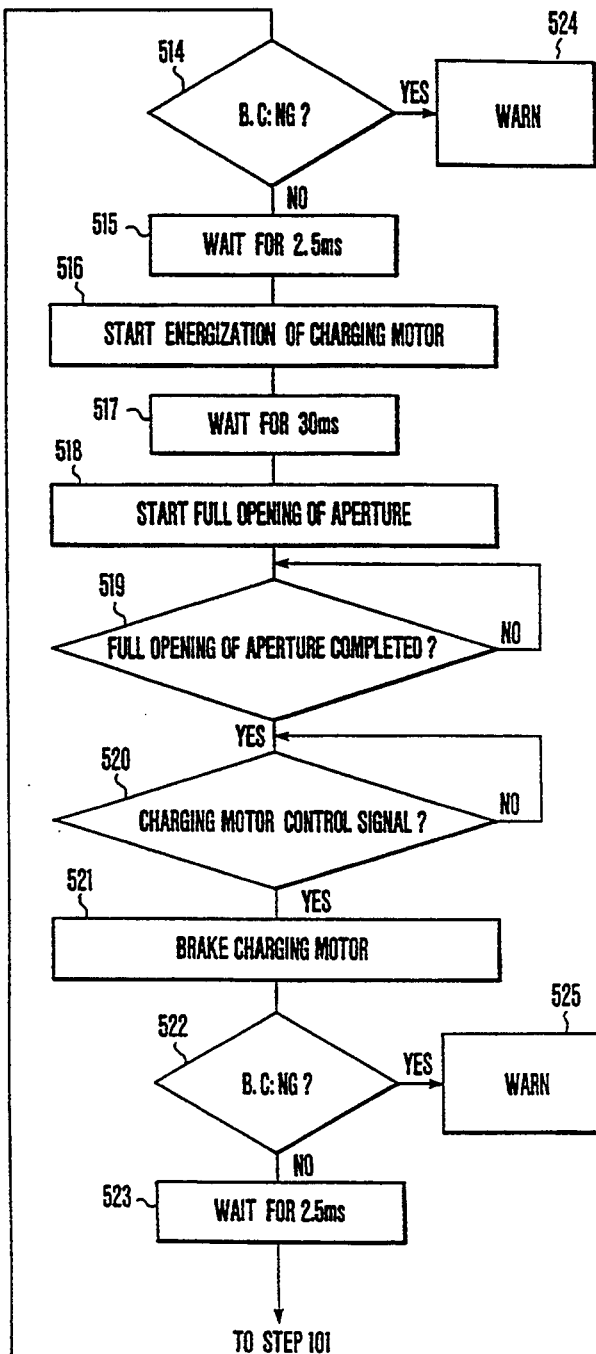

CAMERA

This application is a division of application Ser. No. 07/650,865 filed Feb. 5, 1991, now U.S. Pat. No. 5,182,590.

BACKGROUND OF THE INVENTION

1. Field of the Invention

This invention relates to a camera having a rotary member arranged to detect the movement of film.

2. Description of the Related Art

In imprinting data on the picture plane of film with a data imprinting device of a camera, it has been practiced to imprint the data from the base face of the film, i.e., from on the side of the back cover of the camera. However, characters imprinted from this side of the film tend to smear as the imprinting light is applied through the base layer of the film. Further, since the film base is colored, it is at times difficult to obtain a clear imprint because of an adverse effect of the color of light emitted by a light emitting element or the color of an object image around the data imprinted.

It is known to solve this problem by imprinting data from on the side of the emulsion layer of the film, i.e., from on the side of a photo-taking lens. In the case of a single-lens reflex camera, however, a focal plane shutter unit occupies a major portion of the area of an aperture. The data imprinting device must be arranged in such a way as to avoid hindering the focal plane shutter unit as well as the photo-taking optical path. Further, in order to imprint data in association with a film winding action to be performed after each shot, the data imprinting device must be disposed as close to the aperture as possible. It is, however, very difficult to meet these requirements, particularly in cases where a sprocket is arranged to engage the perforations of the film.

In the conventional camera, the sprocket is arranged to be rotated by the film by engaging the perforations of the film. An encoder is secured to the shaft of the sprocket. An electric digital signal is generated by detecting the degree of rotation of the encoder by means of a photo-sensor. The amount of film feeding is detected by counting the pulses of this signal by a pulse counter.

However, the film perforations and the teeth of the sprocket must be arranged to have a certain fixed tolerance for their engagement. It is, therefore, hardly possible to detect the film feeding amount with a high degree of accuracy by the above-stated known sprocket-type method for detecting a film feeding amount.

Some of the latest cameras are provided with a character information imprinting device of a dot matrix type which is arranged to be driven in association with a film feeding action by an electronic method. However, accurately imprinting the character information or the like in a prescribed part of a film frame plane requires use of a film feeding amount detecting means of a high degree of precision. Since the film feeding amount cannot be accurately detected by the conventional sprocket type film feeding amount detecting means, a friction-driven roller is employed as the film feeding amount detecting means in place of the sprocket.

However, the use of a friction-driven roller which is arranged to be rotated and driven by friction with the film for detecting the amount of film feeding in place of the conventional sprocket brings about the following problem: Referring to FIGS. 21($a$) and 21($b$), in this instance, the film F which has passed the aperture has its traveling direction bent along the outer circumferential surface of the friction-driven roller R while it is moving toward a spool S. Therefore, a compressing force is exerted on the inner film surface f1 which is in contact with the outer circumferential surface of the roller R. This causes the inner film surface f1 to shrink and causes a tensile force to act on the outer film surface f2 to elongate it. As a result, an error arises between an actual film feeding amount and a film feeding amount detected through the rotation angle of the roller R. Hence, the film feeding amount cannot be accurately detected with the roller in the above-stated manner.

In FIGS. 21($a$) and 21($b$), a reference symbol r1 denotes a pinch roller which is provided for pushing the film F against the outer circumferential surface of the friction-driven roller R. A film retaining roller r2 is provided for pushing the film F against the outer circumferential surface of the spool S. A roller support lever L carries both the rollers r1 and r2. A spool chamber SR is formed in a camera body CB. An arrow "a" indicates the direction in which the film F travels. Another arrow "b" indicates the rotating direction of the friction-driven roller R.

SUMMARY OF THE INVENTION

One aspect of this invention lies in the provision of a camera which is compactly arranged to be capable of imprinting data in a position accurately set in association with a film feeding action after each shot, the camera comprising: a data imprinting device which is arranged in an upper part of a space between a spool and an aperture of a camera body in such a way as to imprint data from on the side of the emulsion layer of the film; and a rotary member which is arranged below the data imprinting device to detect the amount of film feeding.

Another aspect of the invention lies in the provision of a camera which is capable of accurately detecting a film feeding amount, .the camera comprising: a film feeding amount detection roller which is arranged to have the position of the outer circumferential surface thereof coincide with the surface of a film rail; and a guide roller disposed between the detection roller and a spool.

Other aspects and features of the invention will become apparent from the following detailed description of an embodiment thereof taken in conjunction with the accompanying drawings.

BRIEF DESCRIPTION OF THE DRAWINGS

FIG. 6 is a cross section of the film feed signal detection unit.

FIG. 7 shows by way of example the conventional film feed detecting roller.

FIG. 8 is a sectional view of an imprinting unit.

FIG. 20 is a flowchart showing an operation for the series sequence of processes.

DETAILED DESCRIPTION OF THE PREFERRED EMBODIMENT

Figure 1:
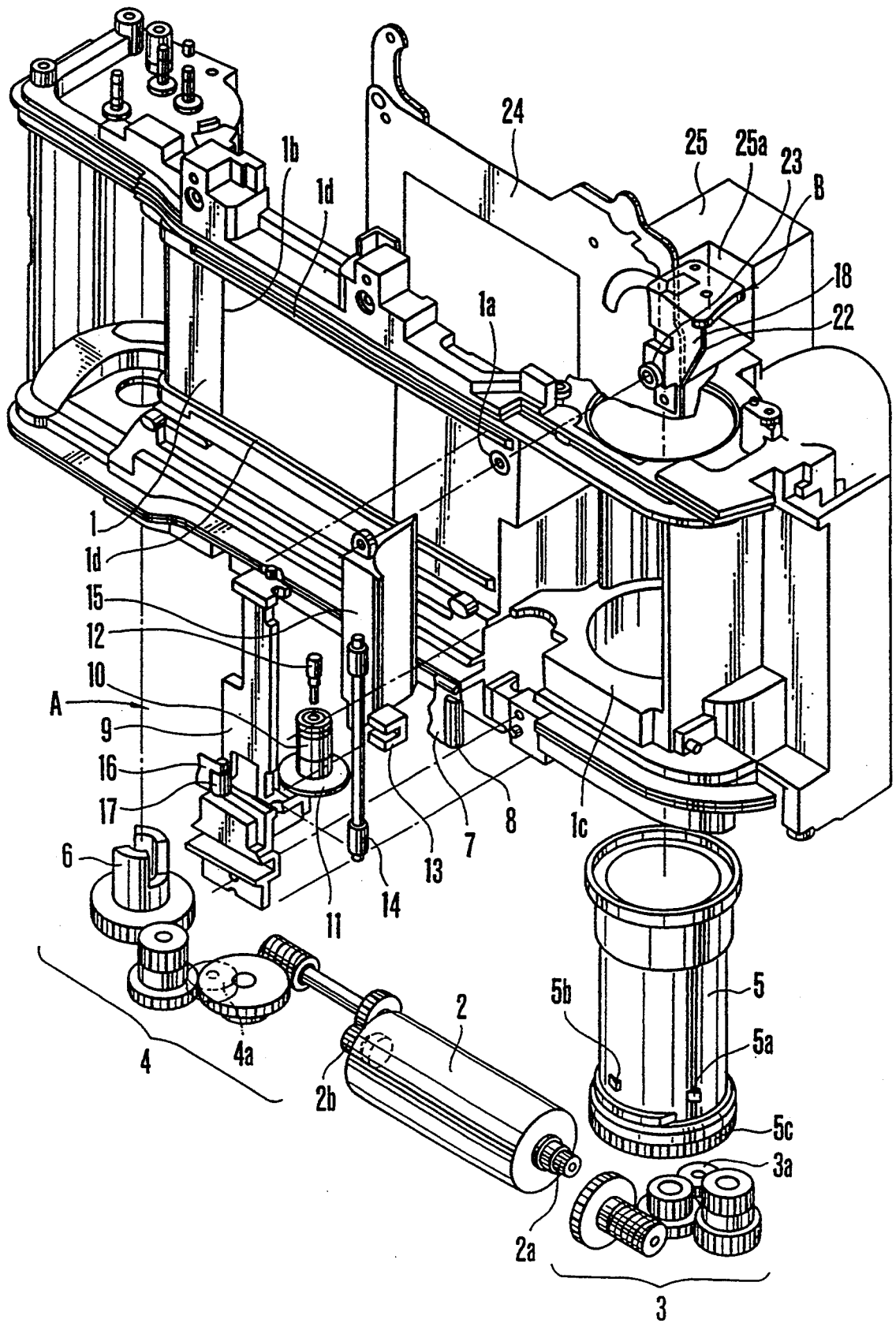
FIG. 1 is an exploded oblique view showing a camera embodying this invention.
Figure 2:
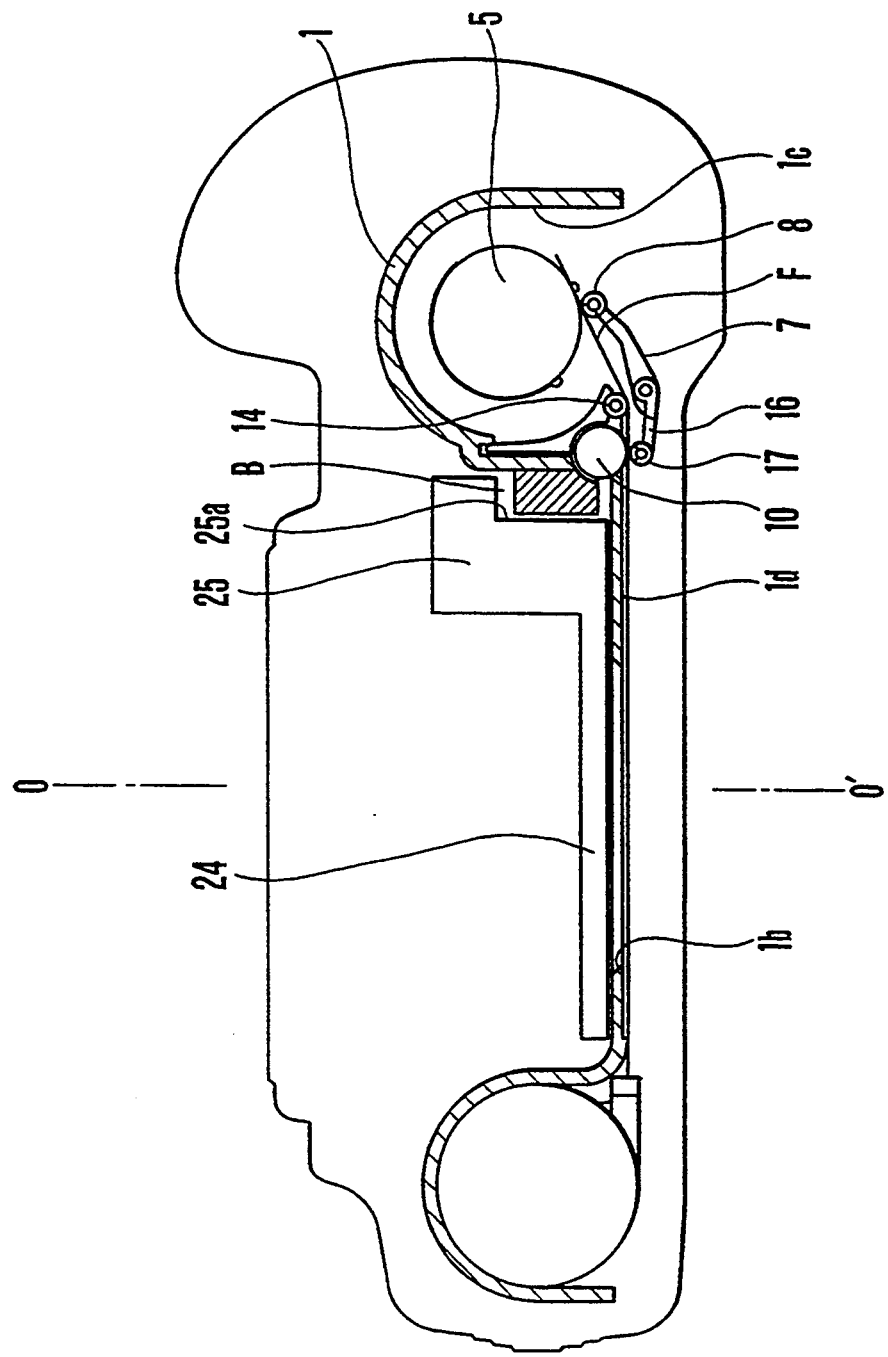
FIG. 2 is a plan view of the same camera.
Figure 3:
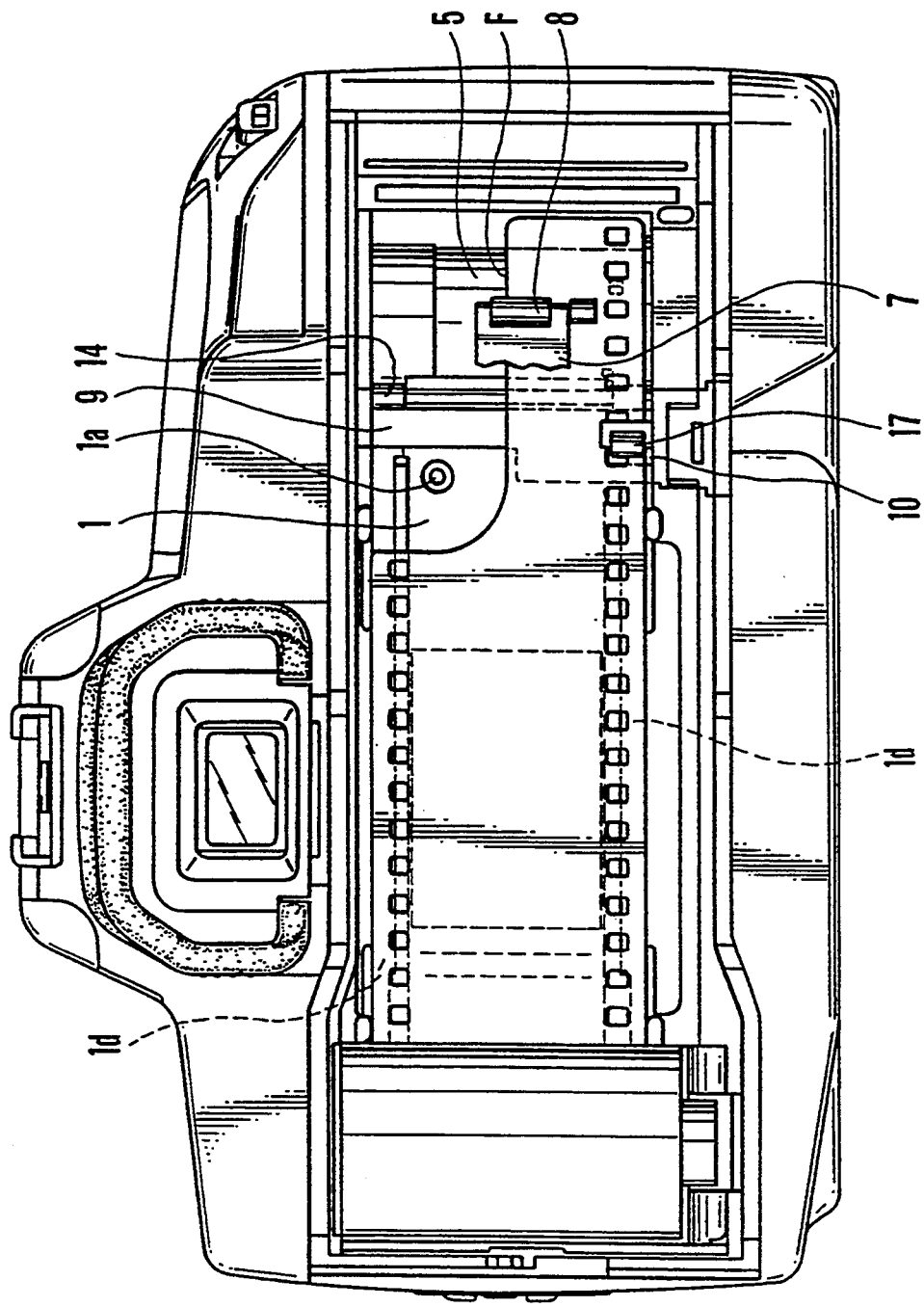
FIG. 3 is a rear elevation of the same camera.

An embodiment of this invention is described below with reference to FIGS. 1 to 20:

The mechanism of this embodiment is arranged as shown in FIG. 1, 2 and 3. The details of the mechanism and its action are also described with reference to FIG. 4 to 10. A camera body 1 is provided with an aperture 1b and a spool chamber 1c. A double-shaft motor 2 is arranged to be capable of rotating in two directions. Pinion gears 2a and 2b are pressure-inserted into the ends of the two shafts of the motor 2. A gear train 3 of a film winding reduction system engages one pinion gear 2a of the double-shaft motor 2 and is arranged to transmit only the forward rotation of the double-shaft motor 2 by the action of a planetary gear 3a. A gear train 4 of a film rewinding reduction system engages the other pinion gear 2b of the motor 2 and is arranged to transmit only the reverse rotation of the motor 2 by the action of a planetary gear 4a.

A spool 5 is provided within the spool chamber 1c for taking the film up thereon. The spool 5 is provided with two claws 5a and 5b arranged on the circumference thereof for catching the perforations of the film and a gear 5c for engaging the output gear of the gear train 3 at the lower end of the spool 5. The spool 5 is thus arranged to be driven by the forward rotation of the double-shaft motor 2 to wind the film thereon. A fork 6 is connected to the output gear of the gear train 4. The fork 6 is arranged to engage the reel of a film cartridge and to be driven to rewind the film thereon.

A film guide 7 is attached to the back cover (not shown) of the camera and is urged to turn by a spring. A roller 8 is rotatably carried by the fore end of the film guide 7 and is arranged to interpose the leader part of the film between itself and the spool 5 when the back cover is closed after the film is set in position. Reference numerals 9 to 15 denote a film feed signal detection unit A. The details of the unit A are shown in FIG. 4.

Figure 4:
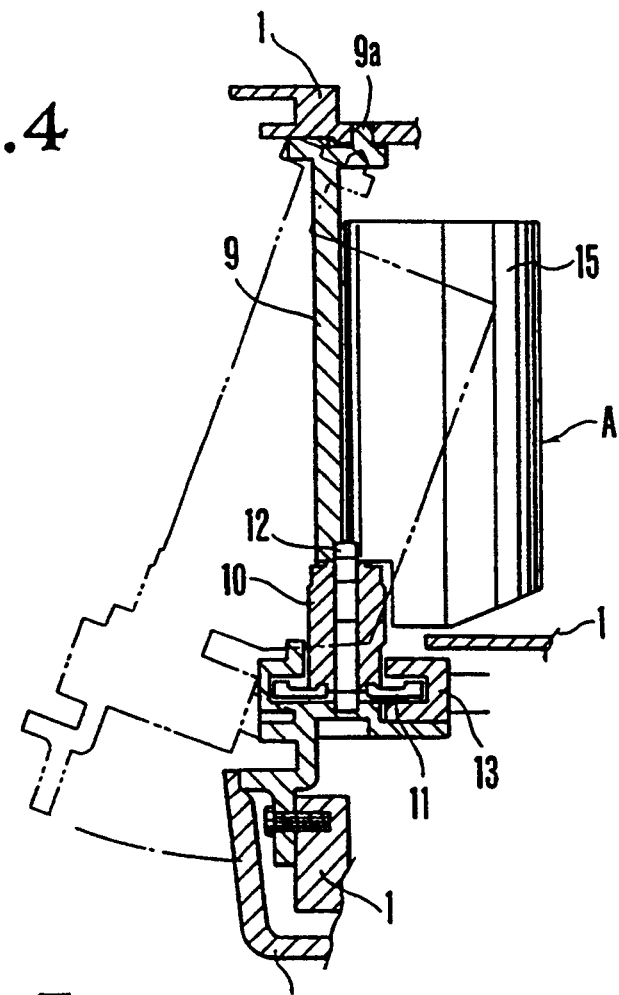
FIG. 4 is a sectional side view showing a film feed signal detection unit.
Figure 5:
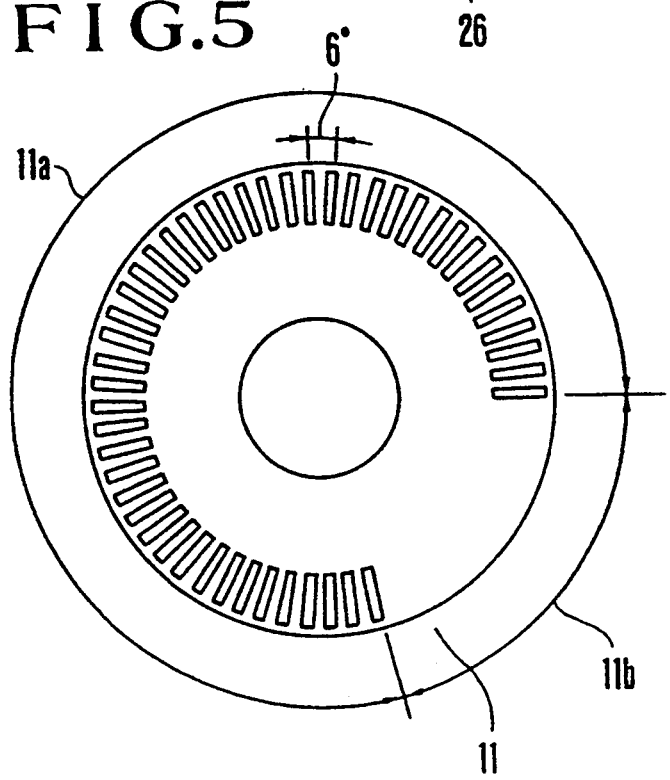
FIG. 5 is a plan view of a slit disc.

Referring to FIG. 4 which is a sectional side view, the film feed signal detection unit A is arranged on a base plate 9. A pulse detection roller 10 is arranged to be rotated by friction with the film as the film is fed, and has its diameter set at 6.05 mm in such a way as to show, with two rotations of it, the one-frame feeding length of film which is 38 mm. A slit disc 11 is attached to the lower end of the pulse detection roller 10. As shown in FIG. 5, the slit disc 11 consists of a pulse generating zone 11a which has a total of 48 light transmitting slits formed and evenly spaced at a pitch of 6°; and a pulse nongenerating zone 11b which covers a light nontransmitting part corresponding to 12 slits. A roller shaft 12 carries the pulse detection roller 10 in such a way as to be rotatable relative to the base plate 9. A photo-interrupter 13 consists of an opposed pair of light projecting and receiving elements which are arranged to detect pulses by the slits of the slit disc 11 which is arranged to rotate between them.

A roller 14, functioning as a guide means, is rotatably carried by one side edge part of the base plate 9. A guide 15 which forms a part of the side wall of the spool chamber 1c of the camera body 1 is secured by a screw to the base plate 9. The guide 15 has a curved surface which is shaped in such a way as to guide the leader part of the film to the spool 5 during an automatic film loading process.

The film feed signal detection unit A which is arranged in the above-stated manner is mounted on the camera body 1 from on the side of the back cover thereof in the following manner: A boss 9a which is formed at the upper end of the base plate 9 is inserted into a hole provided in the ceiling of the spool chamber 1c of the camera body 1. The lower end part of the unit A is secured to the camera body 1 by means of a screw. The screw is hidden by a bottom cover 26 which is an exterior member of the camera. Further, in assembling, the base plate 9 is smoothly connected in such a way as to form a part of the camera body 1. The arrangement is such that, after completion of assembly work, the film feed signal detection unit A is removable by simply removing the bottom cover 26 from the camera body 1.

A guide 16 is rotatably attached to the back cover (not shown) of the camera and is urged to turn by a spring. A roller 17 is rotatably carried by the fore end of the guide 16. When the back cover is closed, the film is interposed in between the pulse detection roller 10 and the roller 17. Further, in FIG. 2, a one-dot chain line 0—0' represents an optical axis.

FIG. 6 shows the film feed signal detection unit A in a state of being mounted on the camera body 1. Referring to FIG. 6, the pulse detection roller 10 is set at about the same height (facial position in the direction of a film guide, in this case the optical axis) as the film guide face of an inner rail 1d of the camera body 1. The roller 14 is also set at about the same height. The arrangement is such that the film F which is guided straight by the inner rail 1d, comes to the pulse detection roller 10. At the roller 10, the film F is urged by the roller 17. This causes the pulse detection roller 10 to rotate accordingly as the film F moves. After that, the film F is kept at the same height as the inner rail 1d by the roller 14. With the circumferential surface of the roller 14 used as a start point, the film F is guided to the circumferential face of the spool 5 by the urging force of the roller 8. This arrangement is necessary, because if the film F is guided onto the spool 5 with the pulse detection roller 10 used as a start point, the film F is bent along the circumferential face of the roller 10 to cause some shrinkage on the inner side of the film F. The shrinkage would result in an error or difference of the film feed amount detected by the pulse detection roller 10 from an actual film feeding amount.

As specified by Japanese Industrial Standards, the thickness of the film F is 0.14 mm, +0.02 or −0.03 mm. Assuming that the thickness t of the film F is 0.14 mm and the inner-side shrinkage is ⅓t, the film is fed to an extent exceeding by 0.44 mm the amount detected by the pulse detection roller 10. It is conceivable to solve this problem by applying some compensation for this to the diameter D of the pulse detection roller 10 in relation to the thickness of the film F. However, in general the film thickness varies greatly. It is, therefore, difficult to accurately set the degree of compensation.

In the case of this invention, this problem is solved by inserting the roller 14 in between the pulse detection roller 10 and the spool 5. The roller 14 keeps the film F in parallel to the plane of the aperture to permit accurate pulse detection.

Next, the structural arrangement of the data imprinting unit B is described with reference to FIG. 8 as follows: In FIG. 8, a reference numeral 18 denotes an imprinting device body which is the base of the data imprinting unit B. A circuit board 19 is arranged to have the circuit of the data imprinting device, etc. disposed thereon. For example, an array 19a of seven 0.3 mm square LED elements are arranged in one row in the direction perpendicularly intersecting the aperture plane and spaced at a pitch of 0.43 mm. The light of the LED element array 19a is arranged to be reflected by a mirror 20 and imaged on the film by a lens 21 in a ¼ reduced size. The imprinting device body 18 is provided with a cover 22. A lens cover 23 is arranged to cover the lens 21. The data imprinting unit B which is arranged in this manner is mounted over the aperture plane, from on the side of the lens, by adjusting the lens cover 23 to an imprint hole 1a of the camera body 1, and is set in position by means of a screw. Therefore, data is imprinted on the film from the emulsion layer of the film which is located on the front side of the film in the direction of the optical axis.

Figure 9:
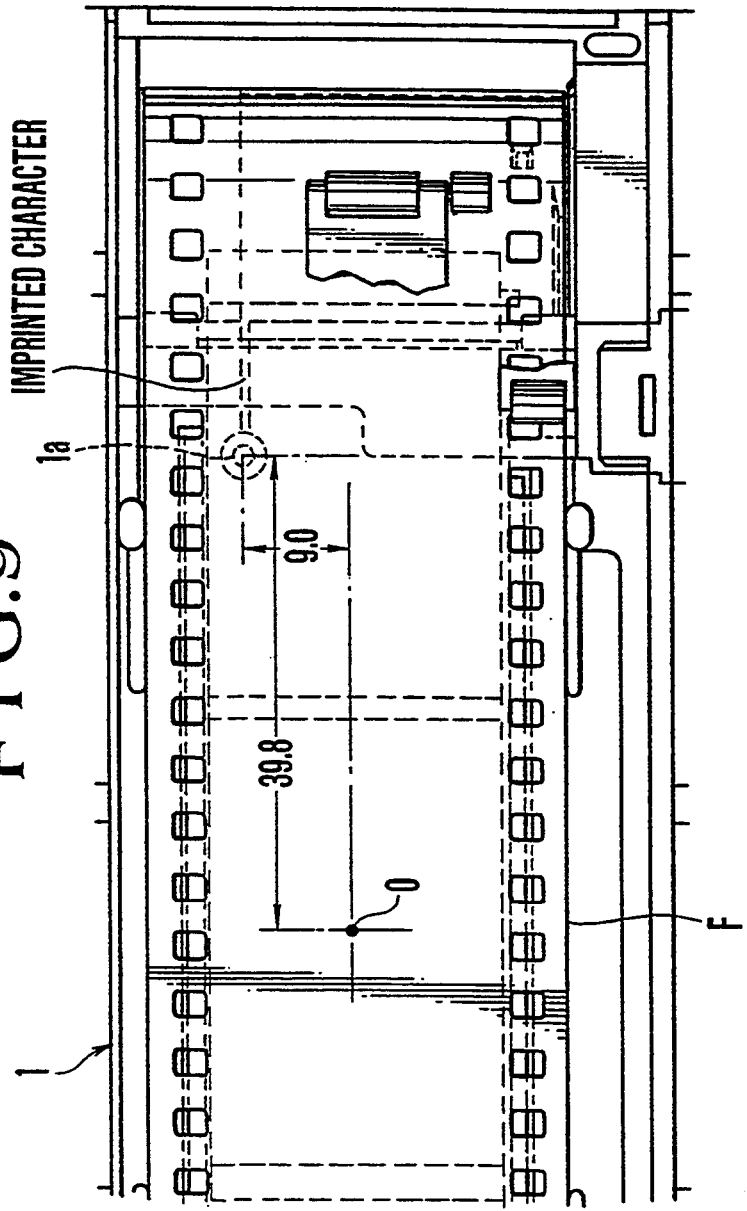
FIG. 9 shows a data imprinting position.
Figure 10:
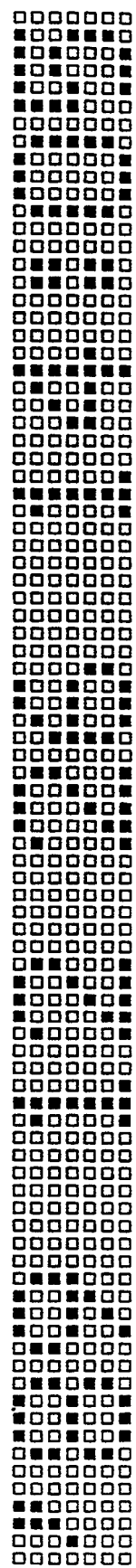
FIG. 10 shows an example of imprint.

FIG. 9 shows by way of example the data imprinting position relative to a picture plane. The above-stated hole 1a of the camera body 1 is located away from the optical axis 39.8 mm in the film feeding direction and 9 mm upward in a direction perpendicular to the film feeding direction. In feeding one-frame portions of the film F after each shot, the pulse detection roller 10 is rotated following the movement of the film F. The photo-interrupter 13 then detects the slits of the slit disc 11. The LED element array 19a repeatedly blinks in such a way as to form 6 dots (including one dot for space) for one character by every-two pulses thus obtained. In other words, the blinking of the LED element array 19a is repeated three times per pulse. FIG. 10 shows an example of a character imprint thus obtained. In this instance, a total of 15 characters, indicating the year, month, day, hours and minutes, are imprinted by a dot matrix using five columns of dots and one spacing dot for each character.

A focal plane shutter unit 24 is provided with a shutter driving part 25. A recessed part 25a is formed leaving some space above the upper part of the shutter driving part 25. As shown in FIG. 2, in the assembled state, the data imprinting unit B is set within the recessed part 25a of the shutter driving part 25. This space is often used by the conventional camera of the kind having a sprocket. In the case of this embodiment, the upper part of the space is occupied by the data imprinting unit B and the lower part of the space by the pulse detection roller 10.

Figure 11:
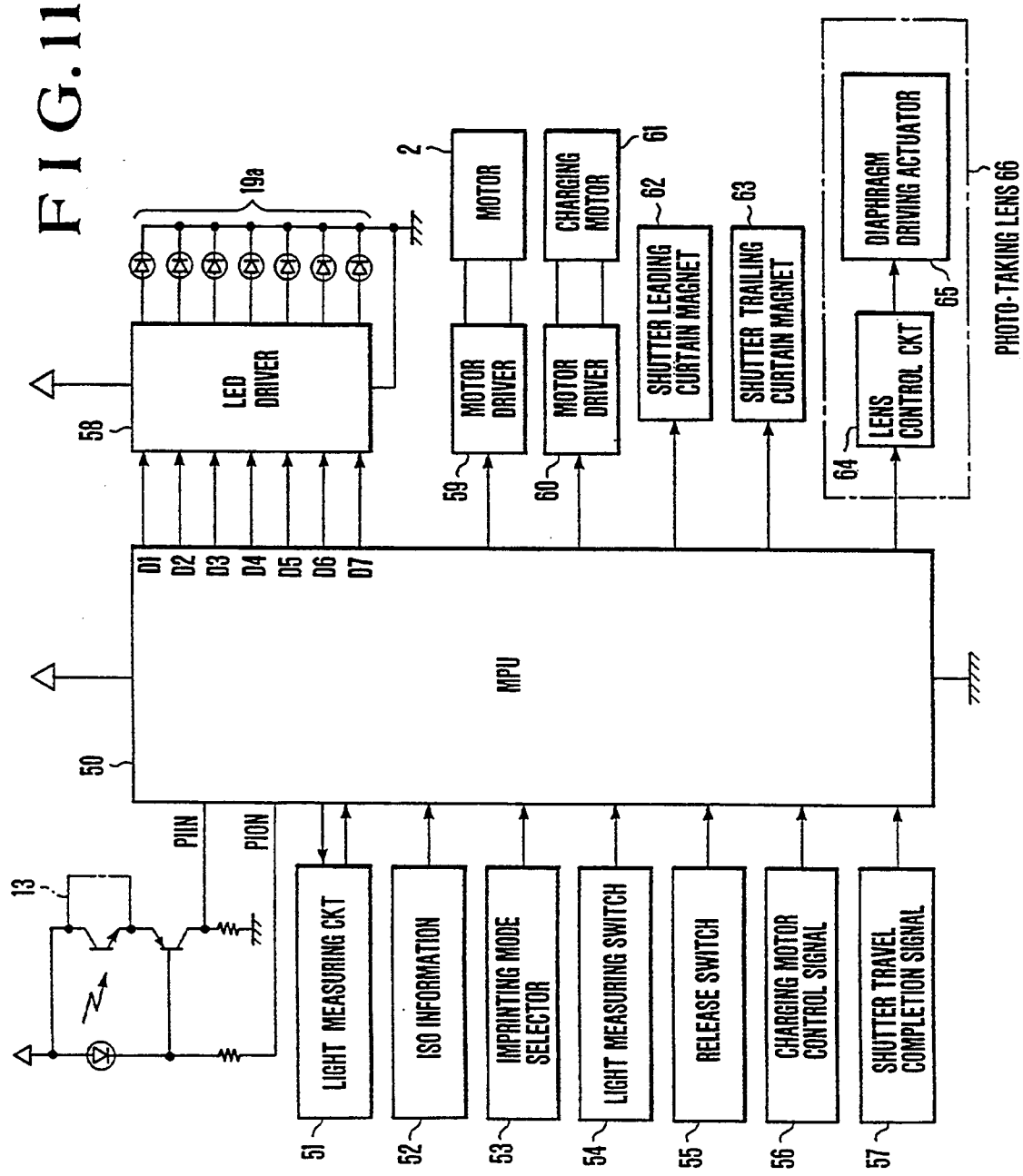
FIG. 11 is a block diagram showing a control circuit.

FIG. 11 shows in a block diagram the control circuit of the camera of this embodiment. The light projecting LED of the photo-interrupter 13 which is arranged to detect the rotation of the slit disc 11 is arranged to be turned on and lit up by the change of the level of a port PION of a microprocessor unit 50 (hereinafter abbreviated MPU) from a high level to a low level. Meanwhile, the light receiving photo-transistor of the photointerrupter 13 is arranged to operate at the light transmitting part of the slit disc 11. Then, the level of the input port PIIN of the MPU 50 changes from a low level to a high level. A light measuring circuit 51 is arranged to perform a light measuring action in accordance with an operation timing instructed by the MPU 50 and to send information to the MPU 50. Information 52 on the ISO value of film sensitivity is arranged to be either read out from a DX code or sent from a manual input means to the MPU 50. An imprinting mode selector 53 is arranged to permit turning on or off of the imprinting mode and also selection of the kind and arrangement of the data to be imprinted. The result of this selection is supplied to the MPU 50. A light measuring switch 54 is arranged to be turned on by the first stroke of a pushing operation on a shutter release button which is not shown. A release switch 55 is arranged to be turned on by the second stroke of the release button. The signals of these switches 54 and 55 are sent to the MPU 50. When either of these switches turns on, the level of the input port of the MPU 50 is changed to a low level. A control signal 56 for a charging motor 61 is supplied from a phase detecting means which is not input to the MPU 50. The control signal 56 is produced for the purpose of bringing the charging motor 61 to a stop with the level of it inverted to a high level or to a low level. A shutter travel completion signal 57 is supplied to the MPU 50 and changes its level from a high level to a low level when the travel of the trailing curtain of the shutter unit 24 is completed.

The seven imprinting LEDs 19a are arranged to be lit up respectively by signals D1 to D7 which are supplied from the MPU 50 through an LED driver 58. Information on numerals, characters, signs, etc. which form imprinting data is stored within the MPU 50. The MPU 50 also has a clock function. The film feeding motor 2 mentioned above is driven by a signal which is applied to the motor via a motor driver 59. The motor driver 59 includes a bridge circuit and is arranged to drive the motor 2 to make forward and reverse rotations and to form a short circuit for applying electric brake to the motor 2. A charging motor 61 is arranged to drive the reflex mirror of the single-lens reflex camera and to perform a shutter charging action by rotating in a given direction. Since the arrangement of the charging motor 61 is known from disclosures made in U.S. Pat. No. 4,864,336, etc., the detailed description of it is omitted here. The charging motor 61 is driven by a signal applied from the MPU 50 via a motor driver 60. In actuating the shutter unit 24, a leading shutter curtain magnet 62 is energized with current in response to a signal from the MPU 50. The leading curtain is thus allowed to begin to travel. After the lapse of a given length of shutter time, the trailing shutter curtain magnet 63 is energized with current in response to a signal from the MPU 50 to allow the trailing curtain to begin to travel. As regards an interface between the photo-taking lens 66 and the camera body 1, only an electrical communication arrangement is provided and no mechanical interconnection is arranged between them. However, a driving power required on the side of the lens 66 is arranged to be supplied from on the side of the camera body. The photo-taking lens 66 is provided with a diaphragm driving actuator 65. The actuator 65 is arranged to be driven by a lens control circuit 64 in accordance with a driving timing instruction from the MPU 50.

Figure 12:
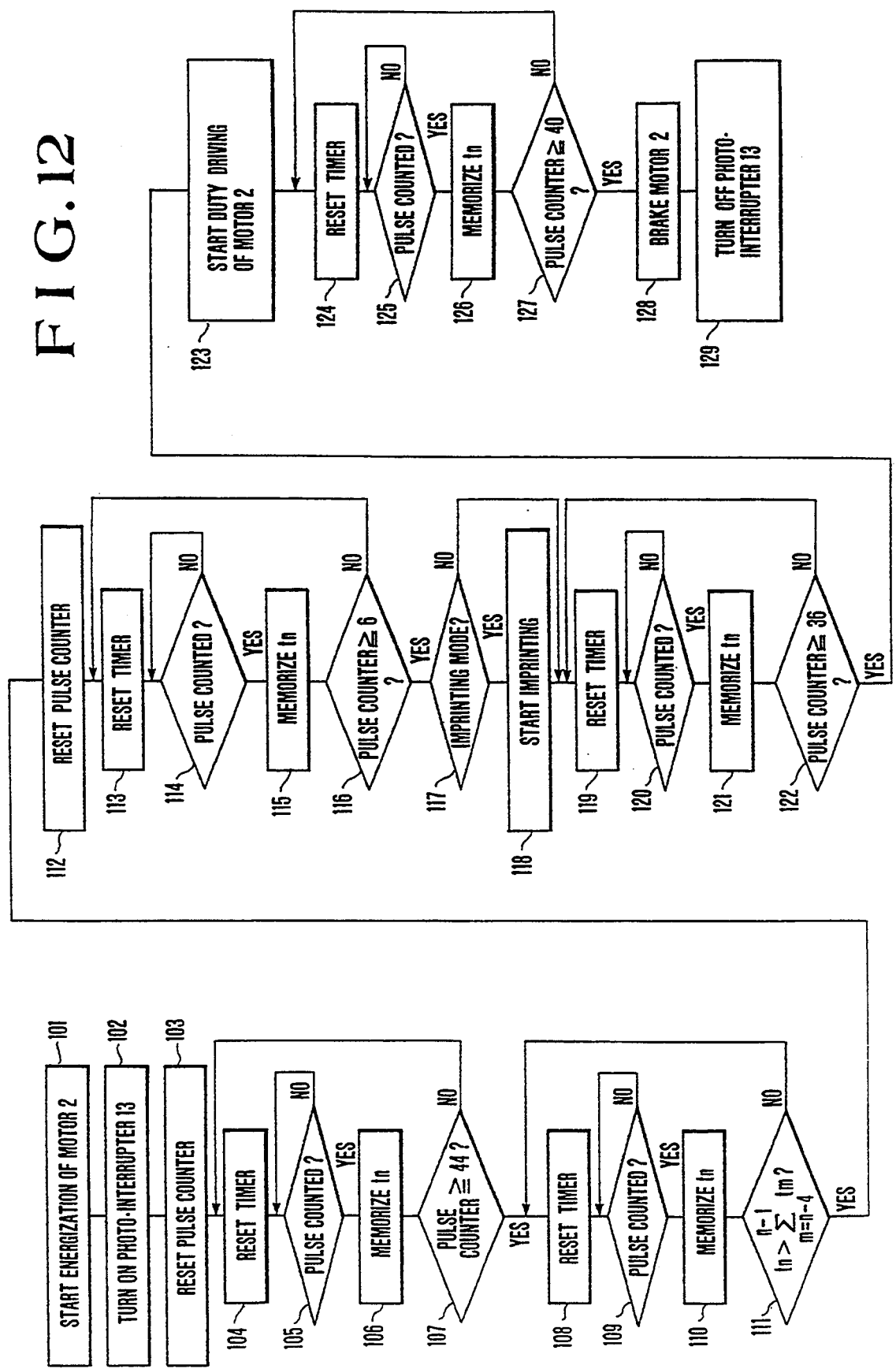
FIG. 12 is a flowchart showing a film feeding action.
Figure 13:
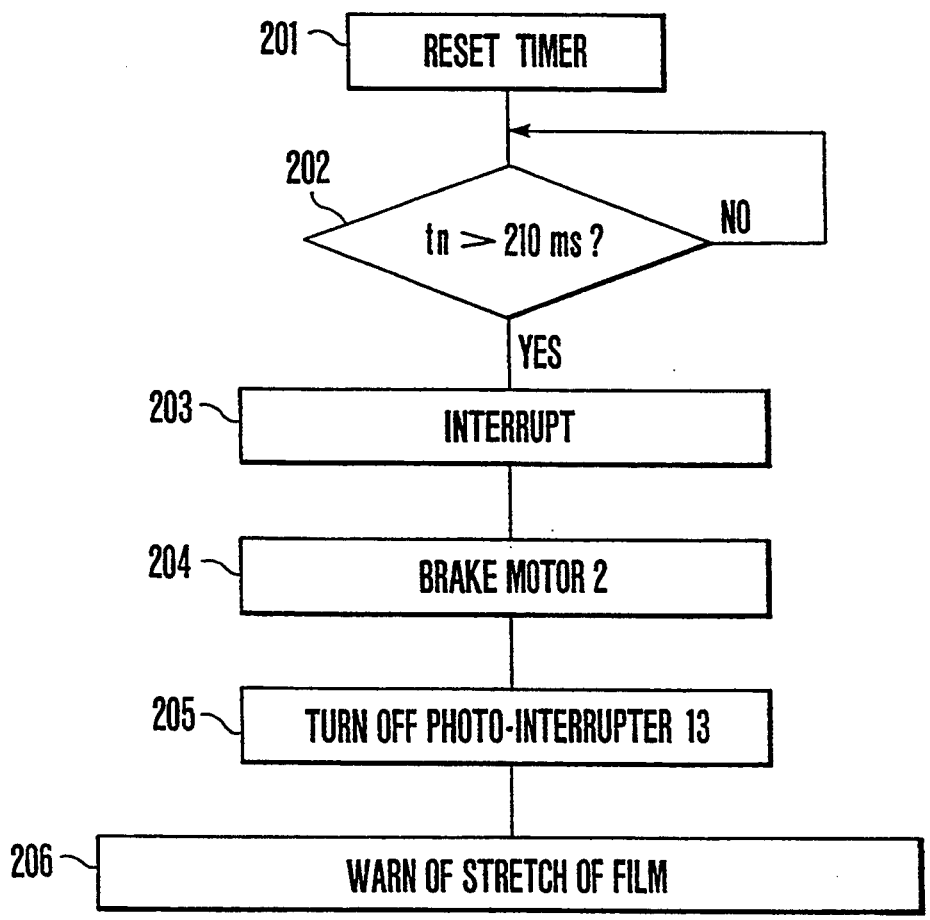
FIG. 13 is a flowchart showing a film stretch detecting action.
Figure 14:
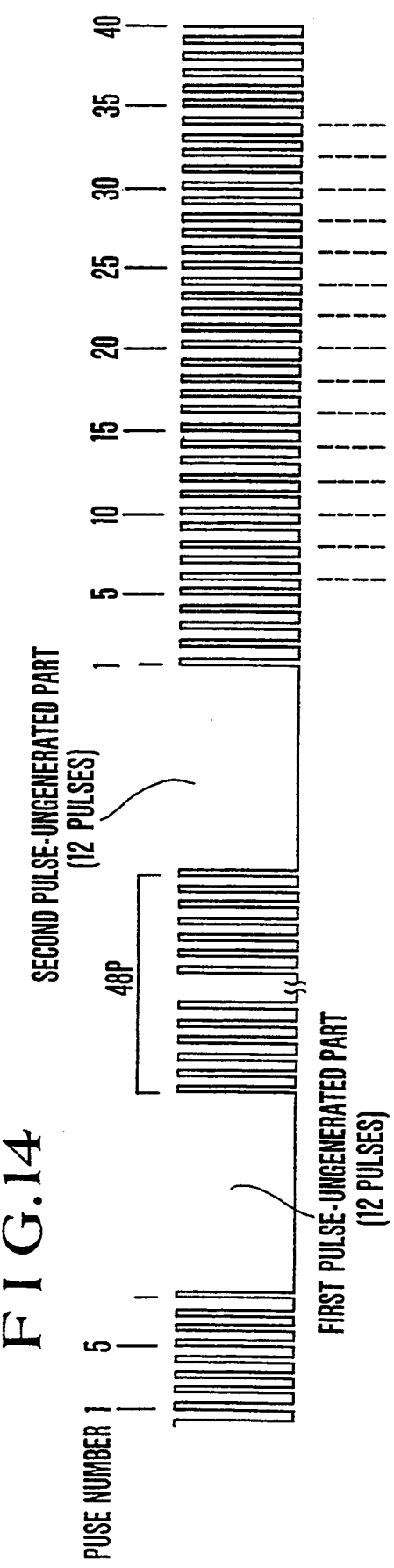
FIG. 14 shows a pulse signal for one-frame feeding.
Figure 15:
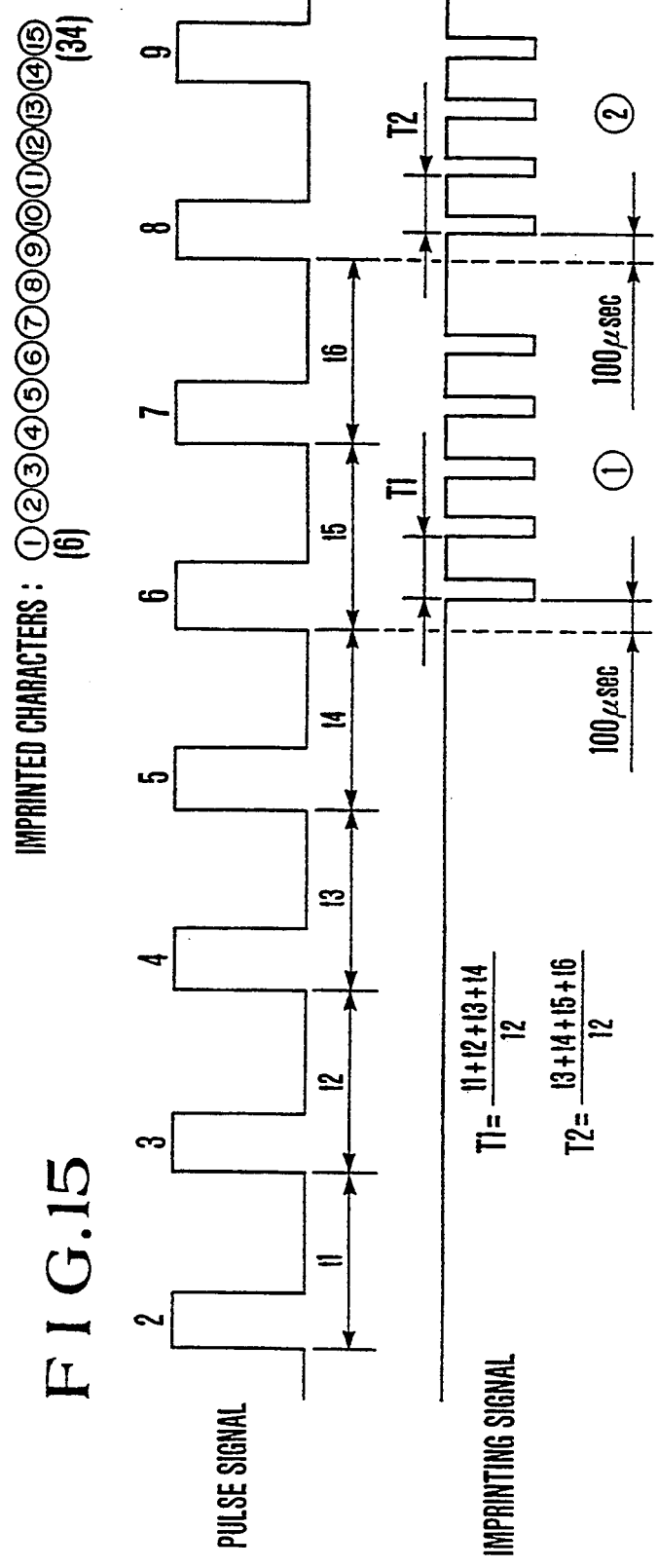
FIG. 15 shows an imprinting signal in relation the pulse signal.

The control operation of the embodiment on film feeding and data imprinting is first described with reference to FIGS. 12 to 15, of which: FIG. 12 is a flowchart showing the flow of film feeding processes. FIG. 13 is a flowchart showing the flow of processes for detecting a stretched state of film. FIG. 14 shows the state of a pulse signal obtained in feeding one-frame portion of film. FIG. 15 shows a relation obtained between the pulse signal and an imprinting signal.

To make the description of these flows readily comprehensible, what is shown in FIG. 14 is first described as follows: Since the slit disc 11 is arranged to make two rotations per one frame portion of the film fed, two pulse-ungenerated parts where no pulse is generated exist, including first and second pulse ungenerated parts. The pulse generating state of the disc 11 as shown in FIG. 14 is on the assumption that the overrunning extent of the film is zero after brake application. The pulse dividing pitch of the pulse generating zone corresponds to 120 pulses for one-frame feeding. However, because of the pulse-ungenerated parts which correspond to 24 (12×2) pulses, the number of pulses actually generated is 96 (48×2). In the actual operating state of the camera, it seldom occurs that the light projecting LEDs of the photointerrupter are put out at the same time as brake application to the motor 2. Besides, the zero overrunning of film also seldom occurs. Therefore, the pulses decrease according to the degree of overrun of the film. The decreasing number of pulses is eight from the start of film winding to a part where the first pulse-ungenerated part begins. However, in the case of this embodiment, the degree of the overrun is controlled in such a manner the eight pulses never completely disappear under any of various conditions. The film feeding speed at the time of start of the motor 2 is extremely slow. However, by virtue of the control, the pulse-ungenerated part never comes to correspond to the extremely slow speed part, so that pulse time intervals can be prevented from excessively increasing. The control over film feeding and data imprinting is performed as follows: The pulses begin to be counted at a point of time where the second pulse-ungenerated part is detected thus indicating the absolute position of the slit disc 11. The data begins to be imprinted from the sixth pulse. One character is formed at the intervals of two pulses. A total of 15 characters thus can be imprinted. The 15th character begins to be imprinted at the 34th pulse. The duty control is performed on the motor 2 at the 36th pulse to lower the film feeding speed. The brake is applied to the motor 2 at the 40th pulse. In order to have a long data imprinting range, the above-stated second pulse-ungenerated part cannot be widely set. Further, if a film-feeding-speed variance allowable range is set wide, the second pulse-ungenerated part cannot be detected in absolute time as the pulse time intervals of the pulse-generated and pulse-ungenerated parts might overlap each other under some conditions. In the case of this embodiment, therefore, the second pulse-ungenerated part is detected by comparing the pulse signal intervals with each other during the process of film feeding.

FIG. 15 shows how the data is imprinted. It is ideal to have the data imprinting signal and the pulse signal in a one-to-one correlation. However, since it is difficult to improve the resolution of the pulse signal to such a degree, the embodiment is arranged to perform predictive control. The lighting time intervals are indexed and divided on the basis of a length of time required for counting four pulses immediately before commencement of data imprinting. The four-pulse counting area is set in such a way as to make it approximately coincide with the one-pitch feeding degree of the planetary gear 3a. This arrangement is intended to eliminate the adverse effect of the planetary gear which presents a mechanical instability factor. The first to 15th imprinted characters are controlled in the abovestated manner. More specifically, the data imprinting proceeds at an interval $T1=(t1+t2+t3+t4)/12$ for the first character; an interval $T2=(t3+t4+t5+t6)/12$ for the second character; and so on. In consideration of time required for computation, the imprinting action is arranged to be constantly delayed by 100 μs from the pulse signal by means of a timer. Further, the lighting time varies with information on the ISO film sensitivity value.

The following describes the flow shown in FIG. 12. At a step 101: A power supply begins to be applied to the film feeding motor 2. At a step 102: The level of the output port PION of the MPU 50 changes from a high level to a low level to turn on the photointerrupter 13. At a step 103: A pulse counter is reset. At a step 104: A timer is reset.

The pulse counter is arranged to count pulses supplied via the input port PIIN of the MPU 50. The timer is arranged to be initialized when it is reset by time measuring means and to restart time measurement. At a step 105: The flow waits for the change of the level of the input port PIIN to a high level. When the level changes to the high level, pulses are considered to have begun to be supplied and the pulse count begins. At a step 106: A length of time "tn" measured by the timer at that point of time is stored. At a step 107: A check is made to find if the counted number of the pulse counter has reached "44". If not, the flow comes back to the step 104 to repeat the pulse count. When the pulse count reaches "44", the flow proceeds to a step 108. At that point of time, the first pulse-ungenerated part has been passed. At the step 108: The timer is reset. At steps 109 and 110: Pulse input is detected and counted. The time "tn" counted by the timer is stored. At a step 111: The past history of the time "tn" is retrospectively checked. Then, the latest stored value of the time "tn" is compared with an integrated value of the time "tn" previously measured four times and stored in the memory. The pulse generating process is determined to have come to the second pulse-ungenerated part if there obtains the following relation:

$$tn > \sum_{m=n-4}^{n-1} tm$$

If not, the flow comes back to the step 108 to repeat the second pulse-ungenerated part detecting action. The second pulse-ungenerated part is formed by omitting 12 slits of the slit disc 11. With the slit disc 11 rotated in a normal manner, the time "tn" in the pulse-ungenerated part becomes a value which is 13 times as large as the value thereof in the pulse-generated part. Therefore, the pulse-ungenerated part can be detected without fail by making a check on the basis of a value four times as large as the time value "tn". This method ensures reliable detection even in the event of a large width of film feeding speed variance due to the fluctuations of various conditions such as power supply voltage, film feed load, etc. This enables the camera to wind the film at a high speed. When the second pulse-ungenerated part is detected, the flow comes to a step 112.

At the step 112: The pulse counter is reset. After that, the control of varied kinds is performed by using the counted value of the pulse counter. At a step 113: The timer is reset. At a step 114: A pulse detecting action begins. The pulses are counted accordingly as they are detected. The counted value of the pulse counter is incremented. At a step 115: The time value "tn" measured by the timer is stored. At a step 116: A check is made to find if the counted value of the pulse counter is equal to or larger than 6. If not, the flow comes back to the step 113 to repeat the pulse detecting action. When the counted value of the pulse counter reaches 6, the flow proceeds to a step 117. At the step 117: If the camera has been set in the imprinting mode by the imprinting mode selector 53, the flow comes to a step 118. At the step 118: The imprinting action described in the foregoing with reference to FIG. 15 begins. If the camera is found to be not in the imprinting mode at the step 117, the flow comes to a step 119. At the step 119: The timer is reset. At a step 120: Pulse counting is performed. At a step 121: The time value "tn" is stored. At a step 122: A check is made to find if the counted value of the pulse counter is equal to or above 36. If not, the flow comes back to the step 119 to repeat the pulse count. When the pulse counted value reaches 36, the flow comes to a step 123. At the step 123: A duty driving action begins to be performed on the motor 2 by intermittently effecting power supply and applying the brake for the purpose of lowering the film feeding speed. The ratio in which the power supply is turned on in the duty driving is changed according to the film feeding speed detected by utilizing the history of the time value "tn". This method is well known and thus does not require further description. At a step 124: The timer is reset. At a step 125: Pulses are counted. At a step 126: The time value "tn" is stored. At a step 127: A check is made to find if the pulse counted value is at least 40. If not, the flow comes back to the step 124 to repeat the pulse detecting action. If the pulse count is found to have reached 40 at the step 127, the flow proceeds to a step 128. At the step 128: The film is brought to a stop by applying the brake to the motor 2. At a step 129: The level of the output port PION is changed to a high level to put out the light of the light projecting LEDs of the photointerrupter 13 and the film feeding operation is terminated.

FIG. 13 is a flowchart showing a flow of a film stretch detecting action, which is to be executed by interrupting the flow of FIG. 12. Referring to FIG. 13, a step 201 at which the timer is reset corresponds to the steps 104, 108, 113, 119 and 124 of FIG. 12. With the timer reset, the pulse interval time measuring action begins. At the next step 202: A check is made to find if the time value "tn" is greater than 210 ms indicative of the value of the film stretch detecting timer. When the time value tn is thus found to exceed 210 ms, the film is considered to be in a stretched state if the timer is not reset in the flow of FIG. 12. The flow then comes to a step 203. At the step 203: An interruption is allowed. At a step 204: The brake is applied by stopping the power supply to the motor 2. At a step 205: The photo-interrupter 13 is turned off. At a step 206: A warning is given of the stretching of the film.

The above describes the film feeding system of the embodiment. In addition to the film feeding motor 2 mentioned in the foregoing, the single-lens reflex camera of this embodiment includes a charging motor which is provided for speeding up continuous photo-taking by driving the mirror and the shutter to carry out preparatory actions before each exposure. In carrying out a regular sequence of processes, the two motors are driven in parallel. However, for a speedy continuous photo-taking operation, the gear ratio of the camera must be set at a high gear ratio. However, when the voltage of the battery used as a power source drops due to consumption, it becomes difficult to ensure an adequate driving action. As a solution of this problem, a method of changing to a series driving action in a case where the film feeding speed becomes very slow or when it comes to a stop, has been disclosed in U.S. Pat. No. 4,816,851. In the case of the camera of the kind having a data imprinting function like this embodiment, it is a serious drawback to have a change in the film feeding speed. Further, if the film comes to a stop before completion of feeding one-frame portion of the film, no adequate operation can be expected even in cases where the pulse signal is arranged to be in a one-to-one relation to the imprinting signal. In view of this, the embodiment is arranged to change the regular sequence of processes in which the above-stated two motors are driven in parallel over to a series sequence in which these motors are driven in series when the result of a battery check indicates a drop of battery voltage to a level below a given level. This arrangement prevents the film from stopping before completion of a film feeding process. In addition to that, it also stabilizes the film feeding speed to ensure an adequate data imprint.

Figure 16:
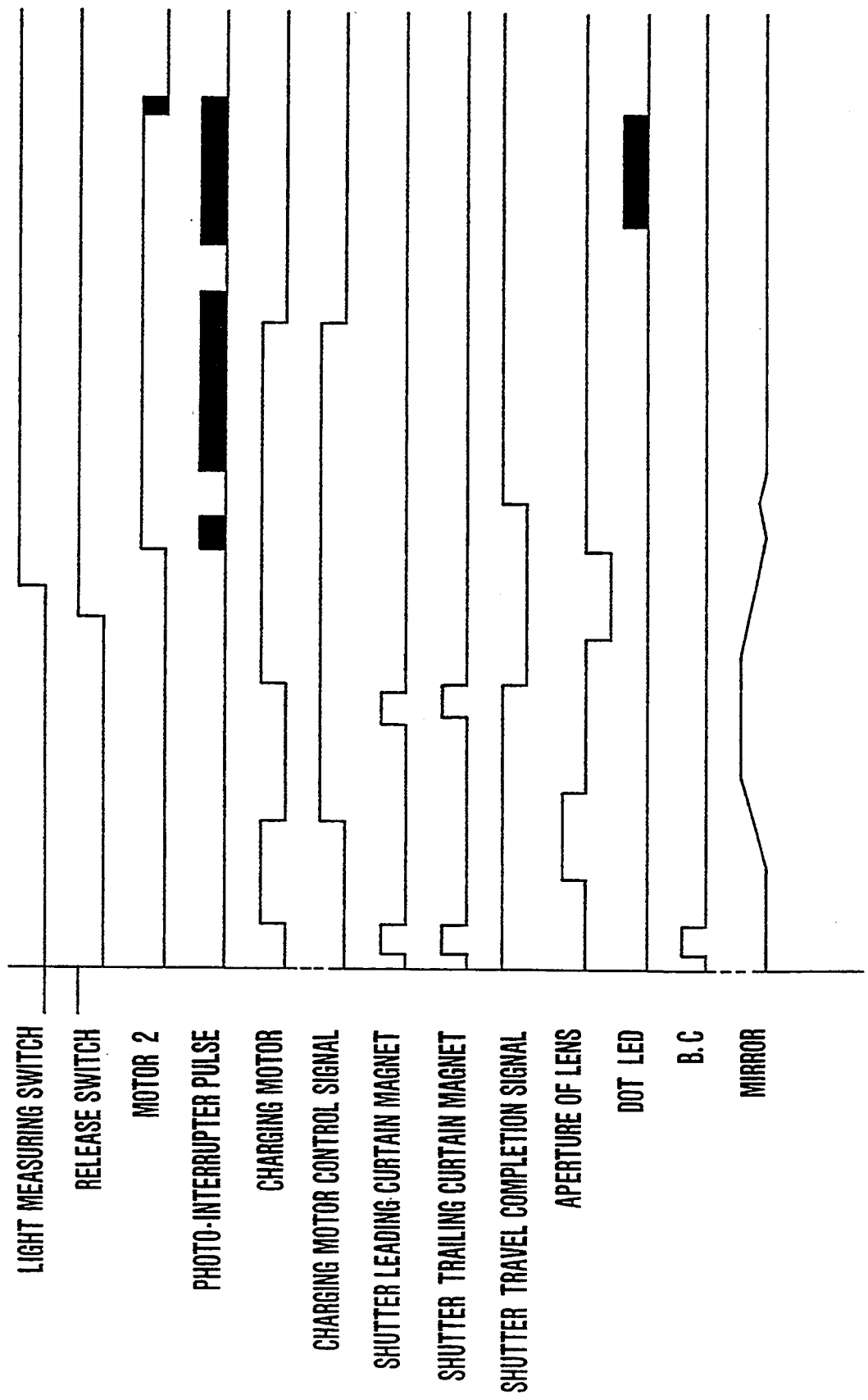
FIG. 16 shows a regular sequence of processes.
Figure 17:
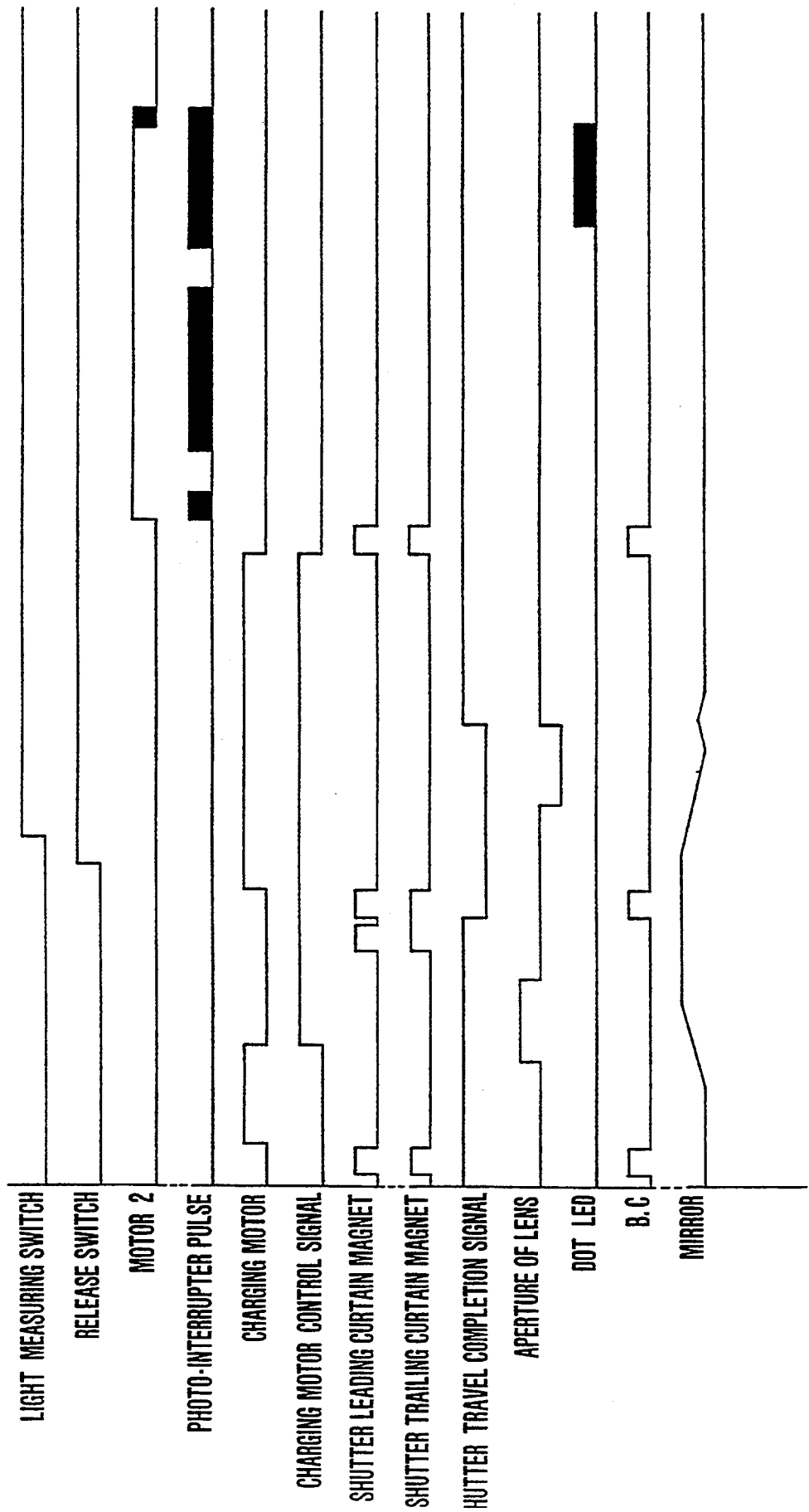
FIG. 17 shows a series sequence of processes.
Figure 18:
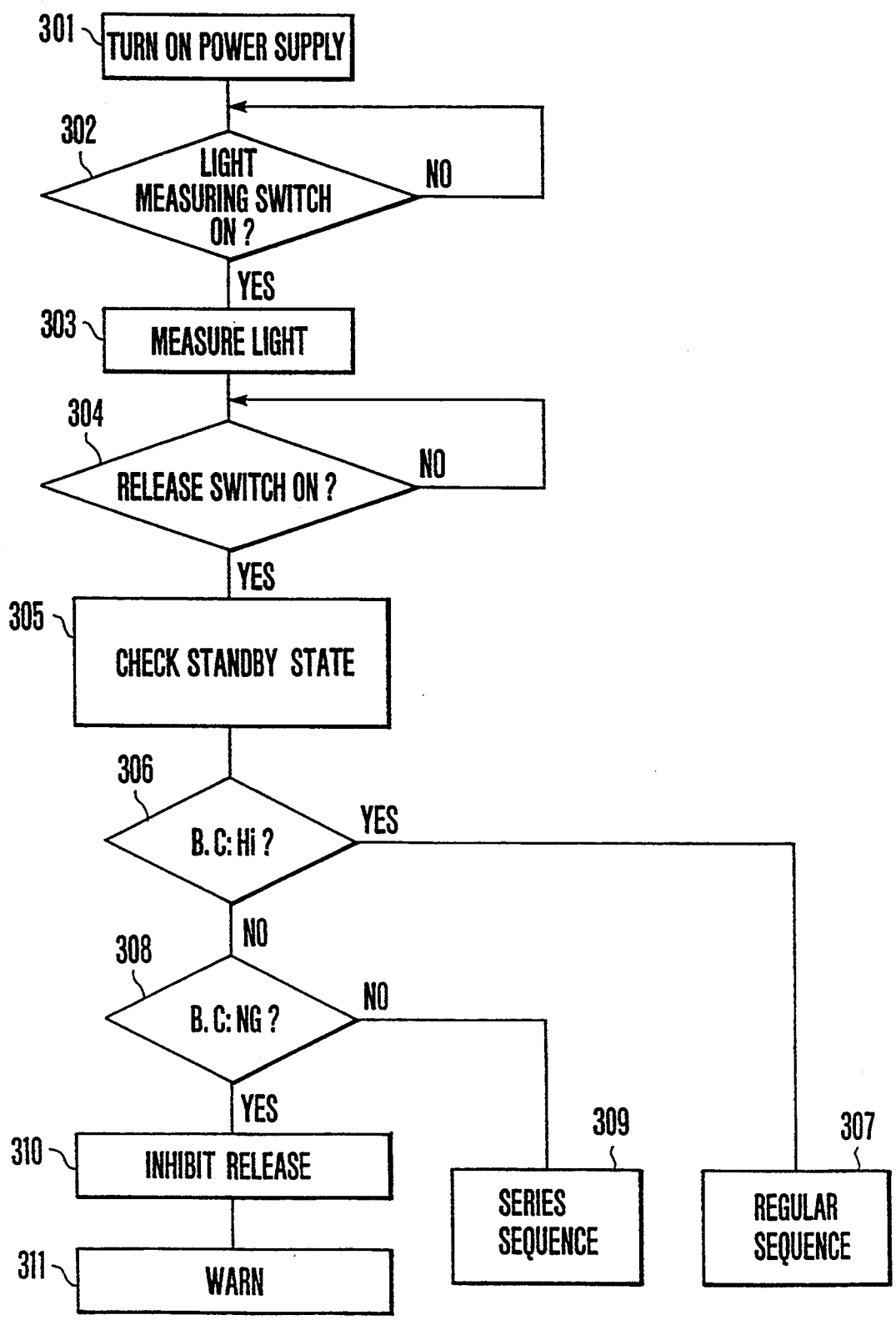
FIG. 18 is a flowchart showing a basic sequence changeover action.

FIG. 16 is a time chart showing the above-stated regular sequence of processes. FIG. 17 is a time chart showing the above-stated series sequence of processes. These sequences of processes are described below with reference to FIGS. 18, 19 and 20:

FIG. 18 is a flowchart showing the basic flow of a sequence change-over action. Referring to FIG. 18, the power supply is turned on at a step 301. At steps 302 and 303: A light measuring action is performed if a light measuring switch is turned on. At a step 304: If the release switch is found to have been turned on, the flow comes to a step 305. At the step 305: A check is made for the standby state of the internal parts of the camera and that of the peripheral systems including the phototaking lens. At a step 306: A battery check is made for the power supply voltage under an actual loaded condition by simultaneously energizing with current the magnets provided for the leading and trailing shutter curtains. In this instance, a shutter curtain travel preventing mechanism acts to prevent the shutter curtains from traveling. If the result of the battery check indicates a power supply voltage higher than a given level, the flow comes to a step 307 to execute the regular sequence of processes. If the level is found to be lower than the given level, the flow proceeds to a step 308. At the step 308: The level is compared with an inhibiting voltage level. If the level is found to be higher than the inhibiting voltage level, the flow comes to a step 309 to execute the series sequence of processes. If the level is found to be lower than the inhibiting voltage level, the flow comes to a step 310 to inhibit a shutter releasing action and to give a warning. The sequence of operation is, in that instance, brought to a stop. The flow of the regular sequence of the above-stated step 307 is shown in FIG. 19 and that of the step 309 is shown in FIG. 20.

Figure 19:
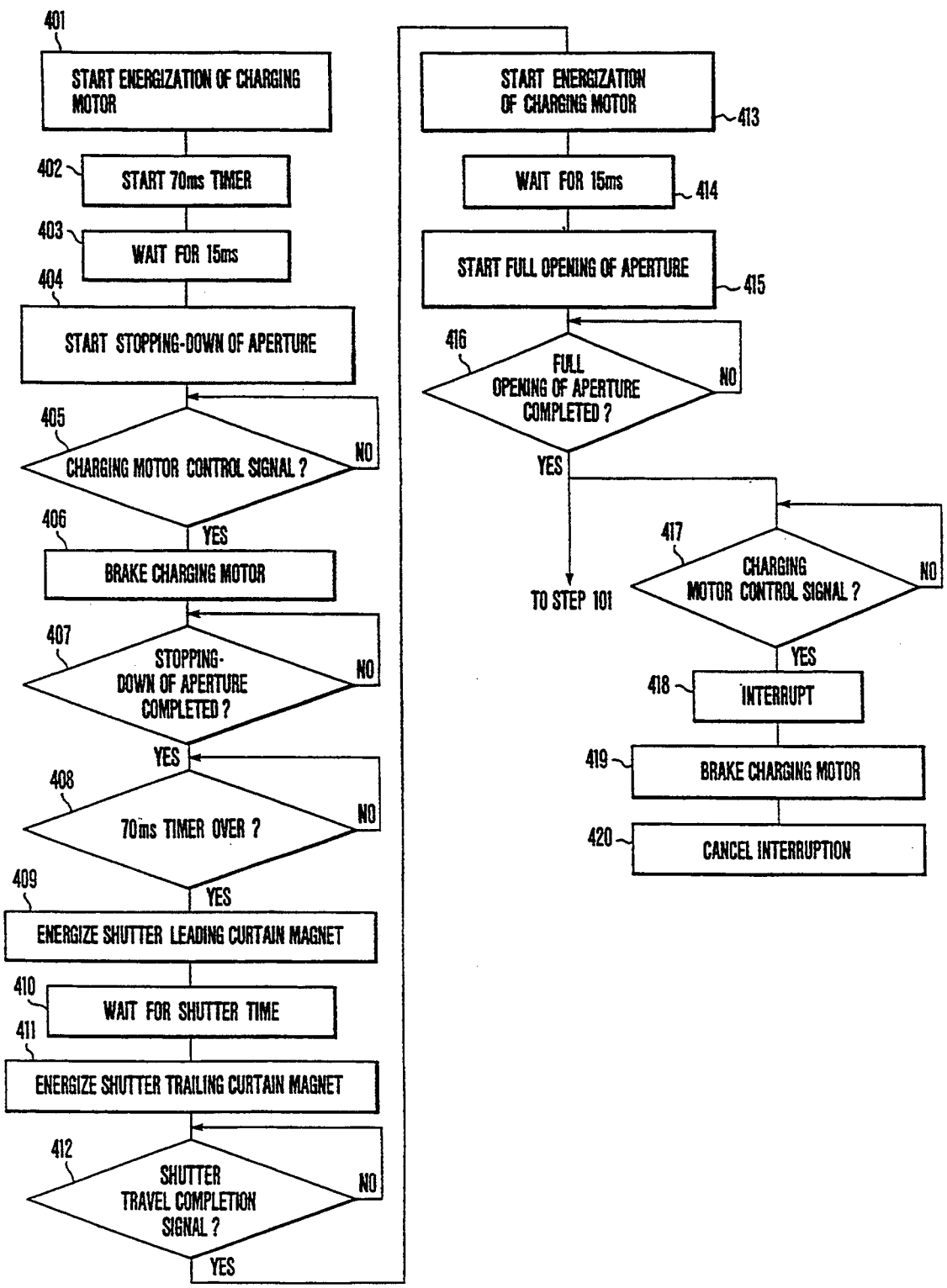
FIG. 19 is a flowchart showing an operation for the regular sequence of processes.
Figure 21A:
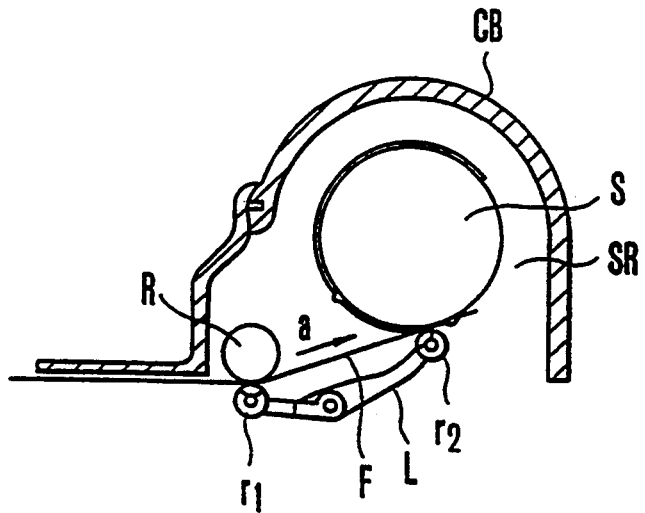
FIGS. 21(a) and 21(b) show by way of example the conventional arrangement wherein a film feeding amount detecting roller is disposed in a position adjacent to a spool.
Figure 21B:
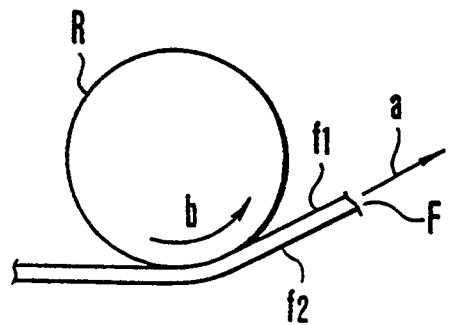

Referring to FIG. 19, the flow of the regular sequence of processes is as follows: At a step 401: A power supply to the charging motor causes a mirror-up action to begin. At a step 402: A 70 ms timer is caused to start its action for stabilizing a release time lag. At a step 403: The flow waits for 15 ms. At a step 404: An actuator which is provided for driving the diaphragm of the photo-taking lens is driven to begin to stop down the aperture of the diaphragm. Steps 405 and 406: The charging motor control signal is checked for its level. When the level of this signal is changed from a low level to a high level, the brake is applied to the charging motor to bring the mirror-up action to an end. At a step 407: A check is made for completion of the aperture stopping down action. If this action is found to have been completed, the flow comes to a step 408. At the step 408: A check is made to find if the operation of the 70 ms timer has been completed. If so, the flow comes to a step 409. At the step 409: The magnet for the leading shutter curtain is energized with current to allow the leading curtain to travel. At a step 410: The flow waits for the lapse of a given length of shutter time. At a step 411: The magnet for the trailing shutter curtain is energized with current to allow the trailing curtain to travel. At a step 412: When completion of the travel of the shutter is detected, the flow comes to a step 413. At the step 413: A current begins to be applied to the charging motor. A mirror-down action and a shutter charging action begin. At a step 414: The flow waits for the lapse of 15 ms. At a step 415: An aperture opening action is performed. At a step 416: A check is made for completion of the aperture opening action. After completion of it, the flow comes to the above-stated step 101 of FIG. 12 to start film feeding by applying a current to the motor 2. The film feeding action is performed according to the flow shown in FIG. 12. Under this condition, the charging motor and the motor 2 are simultaneously put into a state of being driven. At a step 417: During this period, the charging motor control signal is continuously detected. When the level of the charging motor control signal is found to have changed from a high level to a low level, the flow comes to a step 418. At the step 418: An interruption is allowed to the flow of FIG. 12. At a step 419: The brake is applied to the charging motor. At a step 420: The interruption is canceled. The flow comes back to the flow of FIG. 12 and the film feeding comes to an end.

Referring to FIG. 20 which is a flowchart, the flow of the series sequence is described as follows:

At a step 501: The flow waits for 2.5 ms. At a step 502: The mirror-up action is caused to begin by applying a current to the charging motor. At a step 503: The 70 ms timer is started. At a step 504: The flow waits for 30 ms. At a step 505: The photo-taking lens begins to be stopped down. At a step 506: A check is made for the level of the charging motor control signal. When the signal level is found to have changed from a low level to a high level, the flow comes to a step 507. At the step 507: The mirror-up action is ended by applying the brake to the charging motor. At a step 508: A check is made to find if the aperture stopping down action on the diaphragm within the photo-taking lens has been completed. At a step 509: A check is made for the completion of the operation of the 70 ms timer. At steps 510, 511 and 512: A shutter release action is performed in the same manner as in the flow of FIG. 19.

.At a step 513: A check is made to find if the travel of the shutter has been completed. If so, the flow comes to a step 514. At the step 514: The battery is checked. If the battery voltage is found to have reached the inhibiting level, the flow comes to a step 524. At the step 524: A warning is given and the sequence of processes is brought to a stop. If the battery voltage level is found to be above the inhibiting level at the step 514, the flow comes to a step 515. At the step 515: The flow waits for 2.5 ms. At a step 516: The mirror-down and shutter charging actions are caused to begin by applying a current to the charging motor. At a step 517: The flow waits for 30 ms. At a step 518: The aperture is opened within the photo-taking lens. At a step 519: A check is made to find if the aperture opening process is completed. If so, the flow comes to a step 520. At the step 520: A check is made for the level of the charging motor control signal. If the signal is found to have changed from a high level to a low level, the flow comes to a step 521. At the step 521: The brake is applied to the charging motor to end the mirror-down and shutter charging actions.

At a step 522: The battery is checked. If the battery voltage is found to be less than the inhibiting level, the flow comes to a step 525 to give a warning. If the level is found to be above the inhibiting level, the flow comes to a step 523. At the step 523: The flow waits for 2.5 ms for recovery of the power supply before starting the motor 2. The flow then comes to the step 101 of FIG. 12. At the step 101: Film feeding is started by applying a current to the motor 2. After that, the film feeding is executed according to the flow of FIG. 12.

The single-lens reflex camera is arranged according to this invention as follows, as described in the foregoing: The friction contact type roller which detects film feeding is disposed in a space where a sprocket is conventionally disposed, that is, below the edge face part of the aperture on the side of the spool chamber formed in the camera body. The data imprinting unit which is arranged to imprint, on the film surface, information of varied kinds by causing a plurality of LED elements to blink in association with a film feeding action and by using, for example, a mirror and a reducing optical lens, etc. This arrangement enables the camera to be compactly arranged and yet to be capable of adequately carrying out data imprinting in association with the film feeding action after each shot.

Further, it is a feature of the embodiment that the contact plane of the circumferential face of the film feed amount detection roller is arranged to coincide with a film travel plane across the aperture part. In addition to this film .feed amount detection roller, a film guide roller which has the same contact plane as that of the detection roller is disposed between the detection roller and the film take-up spool. Therefore, the embodiment is capable of not only more accurately detecting the amount of film feeding but also more accurately setting the data imprinting position than the conventional camera equipped with the sprocket type film feed amount detecting means.

What is claimed is:

1. A camera, comprising:
   a rotatable detecting roller having an outer circumferential face arranged such that a film engaging portion of said face lies in the same plane as that extending from a film guide surface of a film guide disposed in proximity with an aperture of a camera body;
   detecting means for detecting a rotational state of said detecting roller; and
   guide means disposed in proximity with said detecting roller and arranged to have a film surface engaging portion which lies in the same plane as that extending from said film guide surface, said detecting roller being disposed between said film guide and said guide means.

2. A camera according to claim 1, wherein said detecting roller is disposed between the aperture of said camera body and a spool, and wherein said guide means is a guiding roller disposed between said detecting roller and said spool.

3. A camera according to claim 1, wherein said guide means is a guiding roller supported by said camera body.

4. A camera according to claim 1, wherein said film guide surface is an inner rail surface.

5. A camera, comprising:
 a detecting roller having an outer circumferential face arranged to come into contact with a film surface of a loaded film and to be rotated following the movement of said film, wherein a contact plane of said outer circumferential face is arranged to coincide with a film guide surface of a film guide disposed in proximity with an aperture of a camera body;
 detecting means for detecting a rotational state of said detecting roller; and
 guide means disposed in proximity with said detecting roller and arranged to come into contact with said film, wherein a contact plane of said guide means is arranged to coincide with said film guide surface, said detecting roller being disposed between said film guide and said guide means.

6. A camera according to claim 5, wherein said detecting roller is disposed between the aperture of said camera body and a spool, and wherein said guide means is a guiding roller disposed between said detecting roller and said spool.

7. A camera according to claim 5, wherein said guide means is a guiding roller supported by said camera body.

8. A camera according to claim 5, wherein said film guide surface is an inner rail surface.

* * * * *